Aug. 7, 1945.   R. A. HRABAK   2,381,452
ULTRAVIOLET STERILIZER
Filed Jan. 2, 1943   4 Sheets-Sheet 1

INVENTOR.
ROBERT A. HRABAK
BY Hyde and Meyer
ATTORNEYS

Aug. 7, 1945.    R. A. HRABAK    2,381,452
ULTRAVIOLET STERILIZER
Filed Jan. 2, 1943    4 Sheets-Sheet 2

INVENTOR.
ROBERT A. HRABAK
BY
Hyde and Meyer
ATTORNEYS.

Aug. 7, 1945.  R. A. HRABAK  2,381,452
ULTRAVIOLET STERILIZER
Filed Jan. 2, 1943   4 Sheets-Sheet 3

INVENTOR.
ROBERT A. HRABAK
BY Hyde and Meyer
ATTORNEYS.

Aug. 7, 1945.  R. A. HRABAK  2,381,452
ULTRAVIOLET STERILIZER
Filed Jan. 2, 1943  4 Sheets-Sheet 4

INVENTOR.
ROBERT A. HRABAK
BY
Hyde and Meyer
ATTORNEYS

Patented Aug. 7, 1945

2,381,452

UNITED STATES PATENT OFFICE 2,381,452

ULTRAVIOLET STERILIZER

Robert A. Hrabak, Lakewood, Ohio, assignor to The Art Metal Company, Cleveland, Ohio, a corporation of Ohio Application January 2, 1943, Serial No. 471,194

14 Claims. (Cl. 250—88)

This invention relates to ultraviolet sterilizers, and while devices embodying the present invention are suitable for various sterilizing purposes, such devices are particularly useful in effecting air sterilization or sanitary ventilation.

It is now an accepted fact that ultraviolet radiations, particularly in the spectral range 2000 to 3000 Angstrom units, are quite effective in killing bacteria of disease-carrying species. Although ultraviolet radiations within the aforesaid germicidal range form a fractional part of the invisible spectrum originating in the sun, such radiations are largely absorbed in the upper layers of the earth's atmosphere. Inasmuch as extended or prolonged exposure to ultraviolet radiations of germicidal frequency are injurious to the human system, especially to the skin and eyes, it is perhaps fortunate that the sun's germicidal ultraviolet radiations are largely absorbed by the earth's atmosphere. However, lamps for artificially generating ultraviolet radiations of germicidal frequency are now available, lamps which are of conveniently sized tube form, of low operating cost and which are operative from ordinary alternating electric circuits. A substantial proportion of the output of such lamps is ultraviolet energy at a resonance radiation of 2537 A., which is not far removed from the preferred germicidal radiation of approximately 2650 A.

The present invention has for one of its objects the provision of an ultraviolet sterilizer in which is used a lamp of the aforesaid character, said sterilizer having simple and inexpensive means for supporting the ultraviolet lamp, for enclosing the ballast necessary for the operation of the lamp, and for efficiently directing to the desired regions, for effective sterilizing purposes, the ultraviolet radiations emitted by said lamp.

A further object of the present invention is the provision of an ultraviolet sterilizer adapted for suspension in a substantially horizontal position from an overhead support, such as from a ceiling of a room or chamber, and in which the ultraviolet radiations emanating from the sterilizer lamp pass upwardly and outwardly from both sides of said lamp, to thereby effectively irradiate by germicidal ultraviolet the upper regions of such a room or chamber.

A further object of the present invention is the provision of an ultraviolet sterilizer having along each side thereof means for intercepting, when said sterilizer is horizontally disposed, any downwardly diverging ultraviolet rays and for directing such intercepted rays upwardly and laterally.

A further object of the present invention is the provision of a "ceiling type" ultraviolet sterilizer which not only diverts upwardly and laterally, from each side of the sterilizer, germicidal ultraviolet emanating from the sterilizer lamp but which also diverts downwardly, in the form of a curtain or screen, germicidal ultraviolet emanating from said lamp. With such a sterilizer, it not only is possible to effectively irradiate by germicidal ultraviolet the upper regions of a room or chamber but also, to provide a downwardly directed curtain or screen of germicidal ultraviolet, which enables the sections of the room or chamber lying on opposite sides of said curtain or screen to be effectively isolated from each other.

A further object of the present invention is the provision of an ultraviolet sterilizer having a separate closure for the opening through which pass the downwardly directed ultraviolet radiations, thereby enabling if desired, all ultraviolet radiations emanating from the sterilizer lamp to be used for the irradiation of the upper regions of the room or chamber in which the sterilizer is suspended.

A further object of the present invention is the provision of an ultraviolet sterilizer in which the lamp thereof is mounted below and in substantial alignment with a housing of the sterilizer which encloses the ballast for said lamp, said housing being provided along its bottom surface with reflector means for cooperation with other reflector means in directing upwardly and laterally, from both sides of the sterilizer, germicidal ultraviolet emanating from said lamp.

A further object of the present invention is the provision of an ultraviolet sterilizer having structural and manufacturing simplicity, parts which can be readily and conveniently assembled, and which possess high operating efficiency.

The present invention will be readily understood and many of its practical advantages will be evident from the following description of one embodiment of the invention, as illustrated in the accompanying drawings, in which Fig. 1 is a top plan view of an ultraviolet sterilizer embodying the present invention, the opening of said sterilizer, for the downward passage of a curtain or screen of germicidal ultraviolet, being uncovered;

Figure 10:
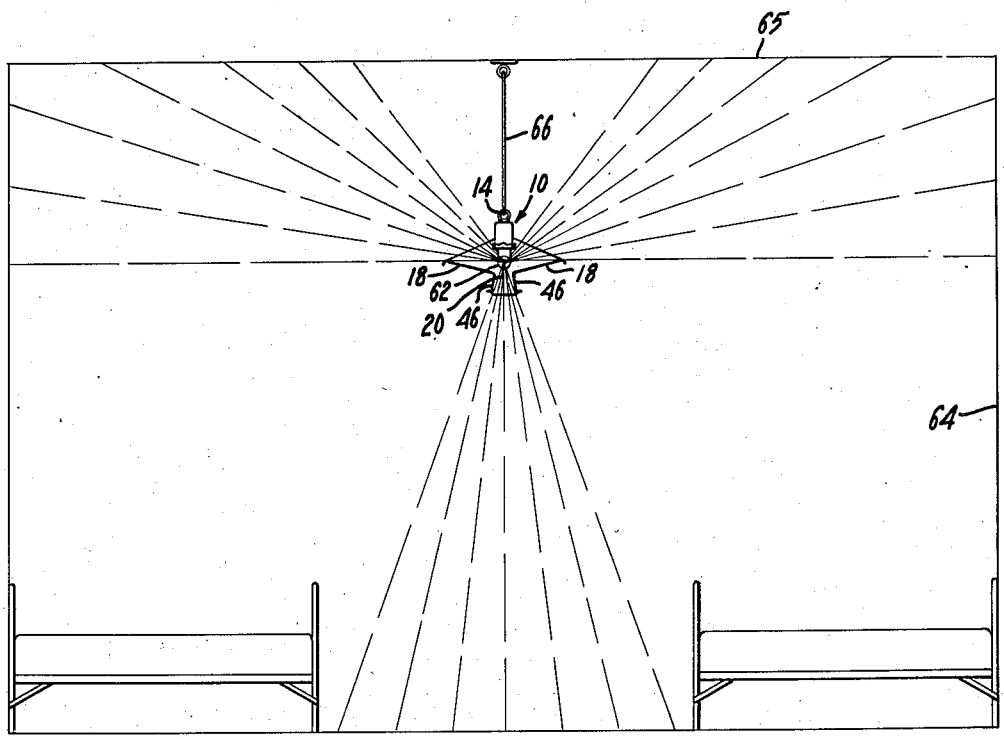
Figure 11:
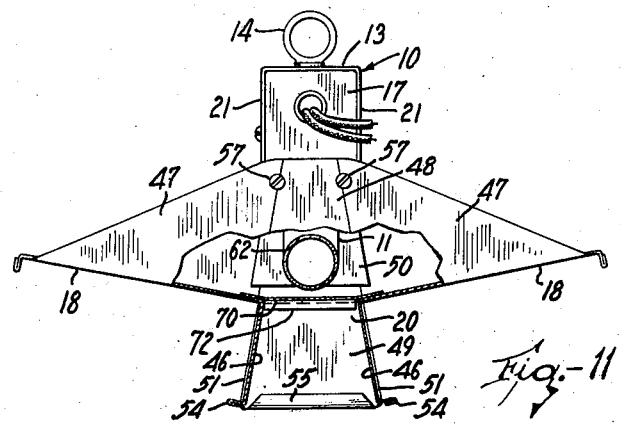

Fig. 10 is a diagrammatic illustration of a room or chamber in which is suspended, from the ceiling thereof, the aforesaid sterilizer, the downward directed curtain or screen of germicidal ultraviolet being confined between two beds in said room or chamber; and Fig. 11 is a view, partly in end elevation and partly in vertical section, showing a closure for the sterilizer opening through which germicidal ultraviolet passes downwardly in the form of a curtain or screen, the closing of said opening causing all ultraviolet radiations emanating from the sterilizer lamp to pass upwardly and laterally from both sides of the sterilizer.

Before the ultraviolet sterilizer here illustrated is specifically described, it is to be understood that the invention here involved is not limited to the details of construction or the exact arrangement of parts herein illustrated or described, as the invention obviously may take other forms. It also is to be understood that the phraseology or terminology herein employed is for the purpose of description and not of limitation, the scope of the present invention being denoted by the appended claims.

Figure 8:
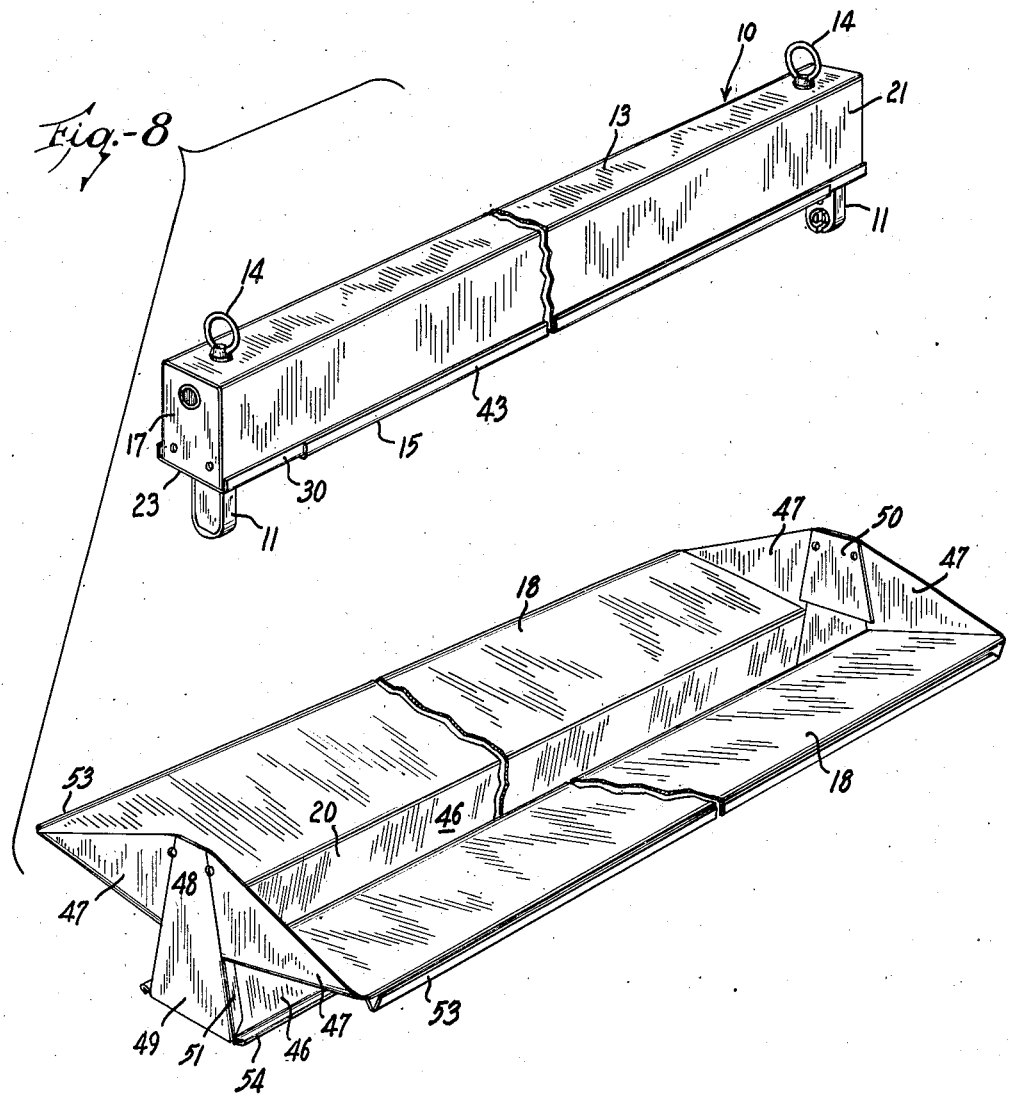
Fig. 8 is a collective perspective view of the two main parts of the sterilizer, separated to indicate their general relation.

As will be evident from the accompanying drawings, particularly from Fig. 8, the ultraviolet sterilizer here illustrated, for the disclosure of one form of the present invention, comprises two main parts, there being an upper part for suspension in a substantially horizontal position from an overhead support, and a lower part connected to and suspended from said upper part.

As best shown in Fig. 8, said upper part comprises an elongated housing 10 of sheet metal or like material and of generally rectangular shape in vertical section. Suitably mounted in said housing, at the ends thereof, are two depending lamp holders 11, and suitably secured to the end portions of the housing top wall 13 are two rings 14 or equivalent means for use in the suspension of the sterilizer from an overhead support, such as from a ceiling of a room or chamber. Suitably secured to the housing 10 and underlying its bottom wall is a reflector 15 to be hereinafter referred to.

The lower part of the sterilizer, as clearly shown in Fig. 8, comprises a pair of end walls for securement to the end walls 17 of the housing 10, and a pair of laterally spaced elongated reflectors 18 which cooperate with the upper reflector 15 in directing upwardly and laterally from both sides of the sterilizer, in a manner which will hereinafter more fully appear, the ultraviolet radiations emitted by the sterilizer lamp. The slot 20 provided by the lateral spacing of the reflectors 18 permits some of the ultraviolet radiations emanating from the sterilizer's lamp to pass downwardly in the form of a curtain or screen; and to confine this downwardly passing ultraviolet to a predetermined area, the lower part of the sterilizer also includes, at the periphery of its slot 20, depending walls which form an elongated duct or passageway for the downward ultraviolet radiations, as will hereinafter appear.

For the fabrication of the housing 10, any suitable fabricating methods may be employed. As here shown, the top wall 13 and the side walls 21 of the housing 10 are integral parts of a simple and inexpensive sheet metal stamping, the side walls being bent at right angles to the top wall. The end walls 17 are separate sheet metal members welded or otherwise suitably secured in place, the present end walls having side edge tabs 22 (see Figs. 7 and 9) for securement to the side walls 21 and top edge tabs 22a for securement to the top wall 13. The housing 10 as thus formed is open at its bottom and to normally close said bottom opening, a separate sheet metal member 23 is here utilized. This closure member constitutes, of course, the housing bottom wall and its securement in closing position may be effected in any suitable manner. As here shown, the housing side walls 21 are internally bridged, at the end portions thereof, by a pair of cross straps 24 to which the housing closure member or bottom wall 23 is removably secured, the cross straps 24 being here provided with depending end portions 25 which are welded or otherwise rigidly secured to the inner surfaces of the housing side walls 21. As will be evident from Fig. 7, screws 27 are here utilized to secure the housing closure member or bottom wall 23 to the cross straps 24, the intermediate portions of said straps being provided with threaded apertures 28 (Fig. 9) to hold said screws and the housing closure member or bottom wall being provided with longitudinally disposed slots 29 or the like to receive said screws. If desired and as here shown, the housing closure member or bottom wall 23 may be provided with upstanding side flanges 30 for telescopic relationship with the housing side walls 23, said walls preferably lying between said flanges, as shown.

Figure 2:
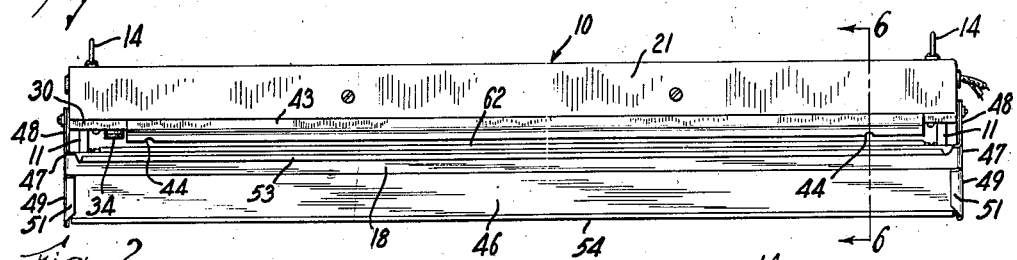
Fig. 2 is an elevational view representative of each of the two sides of said sterilizer.
Figure 7:
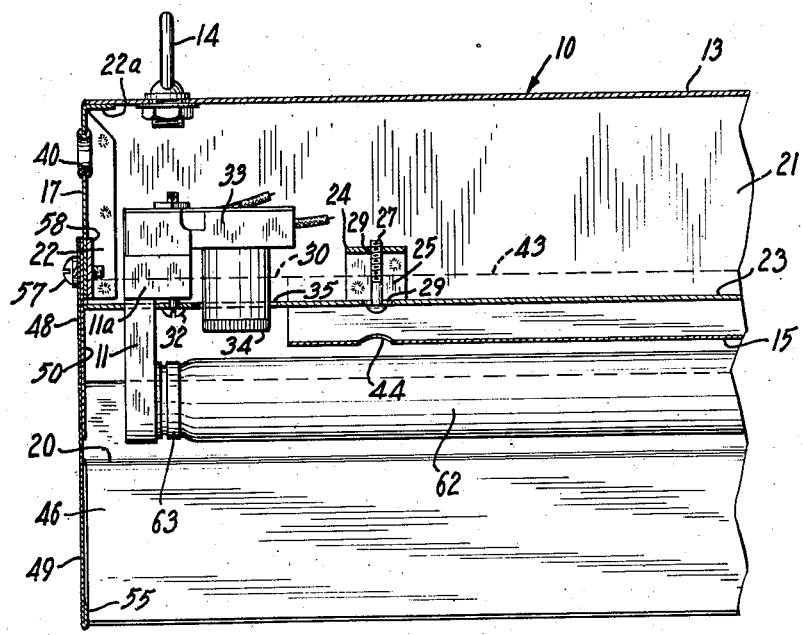
Fig. 7 is a detail vertical sectional view on the line 7—7 of Fig. 1.
Figure 9:
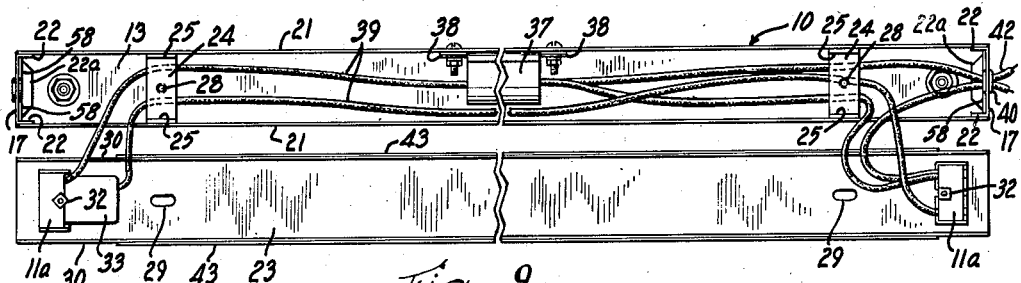
Fig. 9 is a bottom elevational view of the upper housing part of Fig. 8, with the cover of said housing part off and disposed at one side to show the interior of said housing part.

As best shown in Figs. 7 and 9, the lamp holders 11 extend through suitable apertures in the end portions of the bottom closure member 23 of the housing 10, said lamp holders having enlarged upper end portions 11a which lie within said housing and which are suitably secured, such as by the screws 32, to the housing closure member 23. Secured to and electrically connected with the enclosed upper end portion 11a of one of the lamp holders 11 (the left end one thereof, as viewed in the drawings) is a socketed support 33 for the starter 34 which is necessary for the operation of an ultraviolet lamp of the character here used. As best shown in Figs. 2 and 7, said starter projects downwardly from its support 33 and extends through a suitable aperture 35 in the housing closure member or bottom wall 23. As a result, the lower end of the starter is always exposed for convenient manipulation in attaching the starter to and detaching it from the support 33 therefor.

Figure 6:
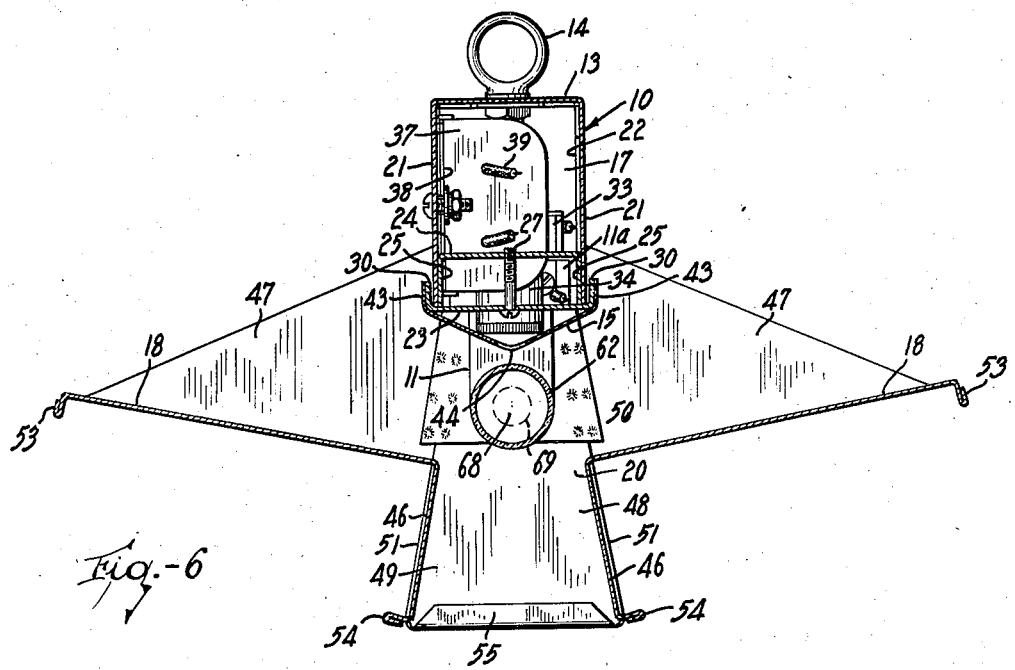
Fig. 6 is a cross-sectional view of the sterilizer, on the line 6—6 of Fig. 1.

A ballast 37 also is necessary for the operation of the sterilizer lamp, and such ballast is mounted within and thus enclosed by the housing 10. As best shown in Figs. 6 and 9, the ballast 37 lies alongside the inner surface of one of the housing side walls 21, the apertured end lugs 38 with which such ballast is provided being screwed or otherwise rigidly secured to such wall. Also located within and enclosed by the housing 10 is the wiring 39 (see Fig. 9) by which the lamp holders 11, the starter 34 and the ballast 37 are electrically connected, and extending outwardly from said housing, through an aperture 40 in its right end wall 17 as here shown, is the wiring 42 for use in the connection of the sterilizer to a source of alternating current.

As best shown in Fig. 6, the reflector 15 is a simple sheet metal member of V-shaped cross section, said member being symmetrically disposed beneath the housing 10 and having upstanding side edge flanges 43 which embrace and which are welded or otherwise rigidly secured to the corresponding flanges 30 of the housing bottom closure member 23. The length of the reflector 15 is here such that it extends from the right end lamp holder 11, as viewed in the drawings, to the depending starter 34, and to afford access to the screws 27 by which the housing bottom closure 23 is removably secured to the housing cross straps 24, said reflector is provided with suitable apertures 44 (see Fig. 7) in alignment with said screws.

Figure 1:
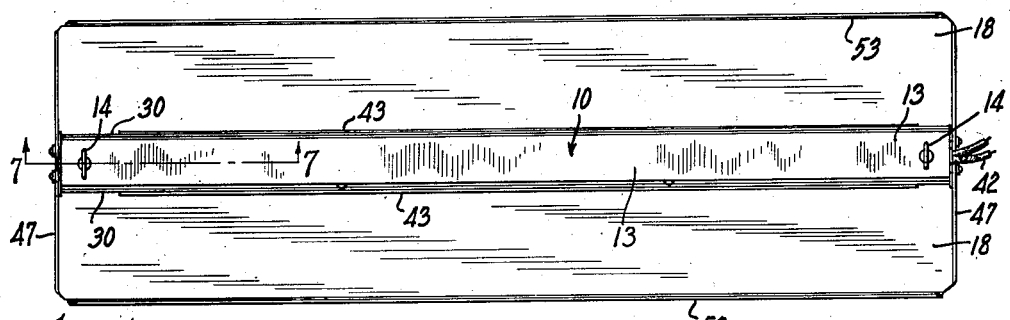
Figure 5:
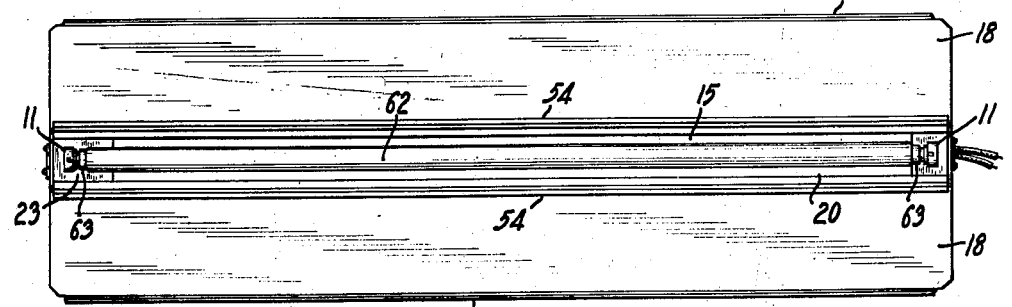
Fig. 5 is a bottom plan view thereof.

As will be evident from Figs. 1, 2 and 5, the upper and lower parts of the sterilizer are substantially coextensive in lengths. As heretofore pointed out, the lower part of the sterilizer comprises a pair of end walls, for connection to the end walls 17 of the housing 10, a pair of laterally spaced elongated reflectors 18, for cooperation with the upper reflector 15 in directing upwardly and laterally from both sides of the sterilizer the major portion of the ultraviolet radiations emitted by the sterilizer's lamp, and a series of laterally connected depending walls at the periphery of the slot 20 between the spaced reflectors 18 to provide a duct or passageway for the ultraviolet radiations which pass downwardly through said slot in the form of a curtain or screen.

For the fabrication of this lower part of the sterilizer, any suitable fabricating methods may be employed. As here shown, the laterally spaced reflectors 18 are provided along their inner side edges with integral depending flanges 46 which constitute the duct side walls, and are provided at their end edges with upstanding integral flanges 47 of generally triangular shape which constitute the outer portions of the end walls of the lower sterilizer part. The middle portions of said end walls are the upper end portions 48 of separate sheet metal members, the depending lower end portions 49 of which constitute the duct end walls. As here shown, the side edges of the middle end wall portions 48 abut the adjacent edges of the outer end wall portions 47, and to effect a simple yet durable maintenance of these portions in assembly, separate sheet metal members 50 are here welded or otherwise secured to the inner surfaces of the middle end wall portions 48, the width of members 50 being such that said members overlap the adjacent edge parts of the outer end wall portions 47 to which they are welded or otherwise secured.

Figures 3, 4:
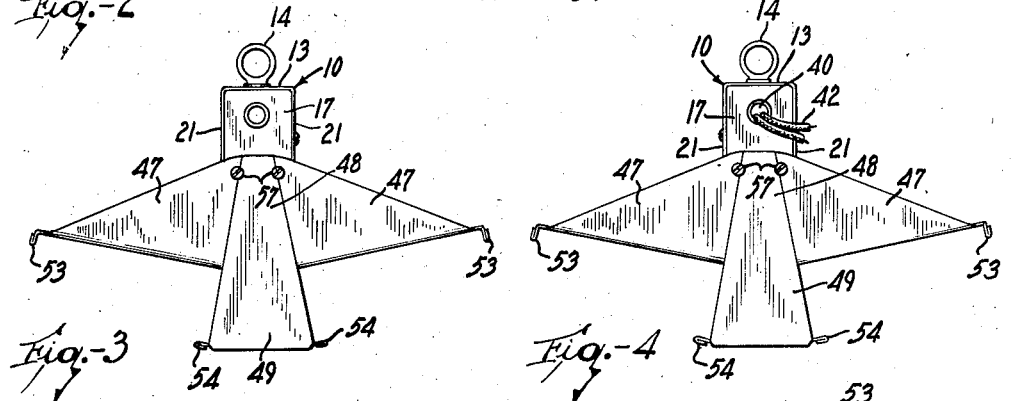
Fig. 3 is a left end elevational view thereof.
Fig. 4 is a right end elevational view thereof.

The two reflectors 18, each with its depending side flange 46 and its two upstanding end flanges 47, are thus separated in generally parallel relationship by the two end members whose upper and lower portions are respectively designated by the reference numerals 48 and 49, members which are of gradually increasing width from top to bottom, as best shown in Figs. 3 and 4. For the lateral connection of the duct walls, the duct end walls 49 are here provided with inwardly extending flanges 51 which receive therebetween and which are welded or otherwise rigidly secured to the end edges of the duct side walls 46.

For increased strength and rigidity, the reflectors 18 are here provided at their outer side edges with depending U-shaped flanges 53, and similar flanges 54 project laterally from the bottom edges of the duct side walls 46. For this same purpose, the duct end walls 49 may be and here are provided at their bottom edges with upturned flanges 55 which lie alongside the inner surfaces thereof, as shown in Figs. 6 and 7.

For the connection of the end walls of the lower part of the sterilizer to the housing end walls 17 of the upper part thereof, screws 57 are here utilized, the connection of these parts being such that the lower sterilizer part is suspended the desired distance below the upper sterilizer part (see Fig. 7). Preferably, the housing end walls 17 are provided with tapping plates 58 to more securely hold the screws 57, the present tapping plates being welded or otherwise suitably secured to the inner surfaces of said end walls. If desired, an eyelet may be mounted in the housing end wall aperture 40 through which extends the outlet wiring 42, and to enable such wiring to extend through either end walls, a like aperture may be provided in the other end wall of the housing as here shown.

As best shown in Fig. 6, the upper and lower parts of the sterilizer are so connected that the laterally spaced lower reflectors 18 are symmetrically disposed with respect to the upper V-shaped reflector 15. It also will be noted from Fig. 6 that when the sterilizer is horizontally disposed—its disposition when in use, the lower reflectors 18 are upwardly and laterally inclined from the slot 20 therebetween, the angularity of such reflectors being somewhat less, as here shown, than that of the two sides of the upper V-shaped reflector 15. From Fig. 6, it also will be evident that the ultraviolet lamp 62, which is detachably carried by the depending lamp holders 11, is positioned directly below the line of convergence of the two sides of the upper reflector 15 and directly above the longitudinal axis of the duct below the slot 20 between the two lower reflectors 18. Inasmuch as the lamp 62 forms no part, per se, of the present invention, it is sufficient to here state that said lamp is of the hot cathode, low voltage tube type, the mercury arc discharge of which is the source of the ultraviolet radiations. A substantial proportion of such radiations are at a resonance radiation of 2537 A., which is not far removed from the preferred germicidal radiation of approximately 2650 A. The cylindrical wall of said lamp is of glass having special wave transmitting characteristics, and the metal end caps 63 of the lamp are provided with the usual paired and longitudinally disposed contact prongs (not shown in the present drawings) for both mechanical and electrical connection of the lamp to the depending lamp holders 11.

For purposes of illustration, there is diagrammatically illustrated in Fig. 10 a room or chamber 64 in which is horizontally suspended from the ceiling 65 thereof, by means of drop chains or equivalent means 66 connected to the sterilizer eye members 14, an ultraviolet sterilizer of the character heretofore described. As will be evident from this view, a major portion of the ultraviolet radiations emitted by the lamp 62 are directed upwardly and laterally by the cooperating reflectors 15, 18 from both sides of the sterilizer. Tests recently made indicate that the most efficient method of using bactericidal ultraviolet for air sterilization or sanitary ventilation of a room or chamber is by the direct irradiation of the air in the upper regions of said room or chamber, and as the present sterilizer directs this ultraviolet from both of its sides to the upper regions of the room or chamber in which it is mounted, is particularly effective in achieving air sterilization or sanitary ventilation of said room or chamber. Obviously if the room or chamber is especially long, one or more additional sterilizers may be mounted therealong, in a manner which will be readily understood.

The operating characteristics of an ultraviolet lamp of the character here used are such that the ultraviolet radiations emitted by said lamp originate in a generally cylindrical zone 68 extending between the terminal electrodes of the lamp and indicated in sectional outline in Fig. 6 by the dotted line circle 69. As will be evident from Fig. 6, the longitudinal axis of this generating zone 68 is coincident with the longitudinal axis of the lamp, the diameter of said zone being substantially one-half of the lamp diameter. Therefore, in order to prevent any of the ultraviolet radiations directed laterally by the reflectors 15, 18 from diverging below the horizontal, when the sterilizer is horizontally suspended, the lower reflectors 18 extend upwardly to the horizontal plane tangential to the top of the lamp generating zone 68, as will be evident from both Figs. 6 and 10.

It is at times desirable not only to irradiate by germicidal ultraviolet the upper regions of a room or chamber but also, to provide in such room or chamber a downward "curtain" or "screen" of germicidal ultraviolet. Such a curtain or screen of germicidal ultraviolet is here effected by the provision of the slot 20, between the laterally spaced lower reflectors 18, and by the downwardly directed duct communicating with such slot. The disposition of the duct walls and extent of their dependency determine, of course, the area covered by the downward curtain or screen of germicidal ultraviolet, and in the present embodiment of the invention, the duct side walls are of downwardly diverging form to increase somewhat the lateral spread of the downwardly passing ultraviolet.

In the illustration of Fig. 10, the downward curtain or screen of germicidal ultraviolet extends between two beds located on opposite sides of the room or chamber 64, with the result that each of said beds is isolated from the other, with obviously desirable air sterilizing effects. It is expected, of course, that no one will remain for any extended period of time in the path of said ultraviolet curtain or screen as prolonged exposure thereto is inadvisable. However, no harmful effects are experienced by one who briefly passes in or walks through or along the ultraviolet curtain or screen.

If it is desired to confine to the upper regions of the room or chamber 64 the ultraviolet radiations emitted by the lamp of the sterilizer mounted in said room or chamber, it is merely necessary to cover the slot 20 between the laterally spaced lower reflectors 18 of such sterilizer. In Fig. 11 is illustrated the sterilizer of Figs. 1 to 10 inclusive with a sheet metal cover member 70 for the sterilizer slot 20. As here shown, this cover member 70 is of sufficient width to enable its longitudinal or side edge portions to rest upon the adjacent inner edge portions of the reflectors 18 with the consequent support of said member in slot-covering position, the length of said cover member being at least as great as that of the slot 20. Preferably and as here shown, the longitudinal or side edge portions of the cover member 70 are upwardly inclined to conform to the upward inclination of the reflector portions upon which they rest, so that the cover member is more or less laterally self-adjusting to its covering position. If desired, said cover member may be provided with one or more depending cross strips which extend into and thereby cooperate with the slot 20 in positioning the cover member over said slot. As here shown there are two such cross strips 72, one located adjacent each end of the cover member, said cross strips comprising the depending inner end portions of sheet metal angle members having their outer end portions in contact with, and welded or otherwise suitably secured to, the lower surface of the end portions of the cover member. By making the upper surface of the cover member 70 of reflecting character, so that it constitutes, in effect, a continuation of the reflectors 18, the ultraviolet radiations which impinge on said cover member are directed upwardly and laterally from both sides of the sterilizer in a manner which will be readily understood. To insure efficient reflectivity of the ultraviolet radiations which impinge thereon, the reflecting surfaces of the reflectors 15, 18 and the cover member 70 may be plated with polished chromium or equivalent material, and if desired, the inner surfaces of the end walls of the lower sterilizer part and the inner surfaces of the duct walls, particularly the side walls 46, may be similarly plated.

From the foregoing description thereof, it will be evident that the ultraviolet sterilizer here illustrated and described is of simple and inexpensive construction, of relatively compact form, of neat and pleasing design and of high operating efficiency. The ballast and internal wiring of the sterilizer are completely enclosed and thereby concealed from view, and the reflectors of the sterilizer are so arranged as to efficiently direct to both sides of the sterilizer, in upward and outward directions, the ultraviolet radiations impinging thereon. In addition to effectively irradiating by germicidal ultraviolet the upper regions of the room or chamber in which it is mounted, the present sterilizer provides, if desired, a downward curtain or screen of germicidal ultraviolet, which is of material benefit in isolating from one another sections of said room or chamber. If said downward ultraviolet curtain or screen is not desired, its elimination can be easily and quickly effected by the use of the cover member 70, and as said cover member is merely laid in covering position, its application and removal can be almost instantly effected. As the germicidal ultraviolet is directed upwardly and laterally from both sides of the sterilizer, a widespread distribution of the ultraviolet results, with effective irradiation of the room or chamber in which the sterilizer is mounted. The sterilizer should be suspended, of course, at a height above that of any standing occupants of said room or chamber, say at a height of seven feet or so, as will be readily understood.

To those skilled in the art to which the present invention relates, other features and advantages of ultraviolet sterilizers embodying such invention will be evident from the foregoing description of one such embodiment.

Having described my invention, I claim:

1. An ultraviolet sterilizer, comprising an elongated support having a pair of longitudinally spaced lamp holders depending therefrom, a tube type ultraviolet lamp extending between and carried by said lamp holders beneath said support, a ballast for said lamp carried by said support, elongated reflector means suspended from said support for directing laterally from both sides of the sterilizer ultraviolet radiations emitted by said lamp, said reflector means having an opening beneath said lamp to permit some of the ultraviolet radiations emitted by said lamp to pass downwardly therethrough, and depending continuous wall means at the periphery of said opening to provide a downwardly directed duct for ultraviolet radiations passing through said opening.

2. An ultraviolet sterilizer, comprising an elongated support having a pair of longitudinally spaced lamp holders depending therefrom, a tube type ultraviolet lamp extending between and carried by said lamp holders beneath said support, a ballast for said lamp carried by said support, elongated reflector means suspended from said support for directing laterally from both sides of the sterilizer ultraviolet radiations emitted by said lamp, said reflector means having an elongated opening beneath and in alignment with said lamp to permit some of the ultraviolet radiations emitted by said lamp to pass downwardly therethrough, and depending continuous wall means at the periphery of said elongated opening to provide a downwardly directed duct for ultraviolet radiations passing through said opening, the side walls of said duct being of downwardly diverging form.

3. An ultraviolet sterilizer, comprising an elongated support having a pair of longitudinally spaced lamp holders depending therefrom, a tube type ultraviolet lamp extending between and carried by said lamp holders beneath said support, upwardly facing elongated reflector portions suspended from said support for directing laterally from both sides of the sterilizer ultraviolet radiations emitted by said lamp, said reflector portions being separated by an opening located below said lamp and permitting some of the ultraviolet radiations emitted by said lamp to pass downwardly therethrough, and a removable cover member for closing said opening.

4. An ultraviolet sterilizer, comprising an elongated support having a pair of longitudinally spaced lamp holders depending therefrom, a tube type ultraviolet lamp extending between and carried by said lamp holders beneath said support, upwardly facing elongated reflector means suspended from said support for directing laterally from both sides of the sterilizer ultraviolet radiations emitted by said lamp, a portion of said reflector means being removable to provide an elongated opening below said lamp which permits some of the ultraviolet radiations emitted by said lamp to pass downwardly therethrough.

5. An ultraviolet sterilizer, comprising an elongated support having a pair of longitudinally spaced lamp holders depending therefrom, a tube type ultraviolet lamp extending between and carried by said lamp holders beneath said support, upwardly facing elongated reflector means suspended from said support for directing laterally from both sides of the sterilizer ultraviolet radiations emitted by said lamp, said reflector means having a generally flat reflector portion located below said lamp and also having upwardly and laterally inclined reflector portions on opposite sides of said generally flat portion, said generally flat portion being removable to provide below said lamp an opening through which downwardly may pass some of the ultraviolet radiations emitted by said lamp.

6. An ultraviolet sterilizer, comprising an elongated support having a pair of longitudinally spaced lamp holders depending therefrom, a tube type ultraviolet lamp extending between and carried by said lamp holders beneath said support, upwardly facing elongated reflector means suspended from said support for directing laterally from both sides of the sterilizer ultraviolet radiations emitted by said lamp, said reflector means having an elongated opening located beneath and in alignment with said lamp and also having upwardly and laterally inclined reflector portions on opposite sides of said opening, said opening permitting some of the ultraviolet radiations emitted by said lamp to pass downwardly therethrough, and a removable cover for closing said opening.

7. An ultraviolet sterilizer, comprising an elongated support having a pair of longitudinally spaced lamp holders depending therefrom, a tube type ultraviolet lamp extending between and carried by said lamp holders beneath and spaced from said support, downwardly facing elongated upper reflector means carried by said support in the space between it and said lamp, and upwardly facing elongated lower reflector means suspended from said support and cooperable with said upper reflector means in directing laterally from both sides of the sterilizer ultraviolet radiations emitted by said lamp, said lower reflector means extending laterally beyond that of said upper reflector means and having an opening below said upper reflector means, said opening permitting some of the ultraviolet radiations emitted by said lamp to pass downwardly therethrough.

8. An ultraviolet sterilizer, comprising an elongated support having a pair of longitudinally spaced lamp holders depending therefrom, a tube type ultraviolet lamp extending between and carried by said lamp holders beneath said support and substantially in alignment with the longitudinal axis of said support, said lamp having an ultraviolet generating zone having its longitudinal axis substantially coincident with the longitudinal axis of the lamp, and upwardly facing elongated reflector means suspended from said support for directing laterally from both sides of the sterilizer ultraviolet radiations emitted by said lamp, the outer side edges of said reflector means being disposed at all times substantially in a horizontal plane tangential to the top of the lamp generating zone, whereby ultraviolet radiations directed laterally from the sterilizer are prevented from diverging below the horizontal.

9. An ultraviolet sterilizer, comprising an elongated support having a pair of longitudinally spaced lamp holders depending therefrom, a tube type ultraviolet lamp extending between and carried by said lamp holders beneath and spaced from said support, downwardly facing elongated upper reflector means carried by and separate from said support and disposed in the space between it and said lamp, and upwardly facing elongated lower reflector means suspended from said support and cooperable with said upper reflector means in directing laterally from both sides of the sterilizer ultraviolet radiations emitted by said lamp.

10. An ultraviolet sterilizer, comprising an elongated support having a pair of longitudinally spaced lamp holders depending therefrom, a tube type ultraviolet lamp extending between and carried by said lamp holders beneath and spaced from said support, elongated upper reflector means carried by said support in the space between it and said lamp and having upwardly and laterally disposed downwardly facing reflector portions lying on opposite sides of the vertical plane of the longitudinal axis of said lamp, and upwardly facing elongated lower reflector means suspended from said support and cooperable with said upper reflector means in directing laterally from both sides of the sterilizer ultraviolet radiations emitted by said lamps.

11. An ultraviolet sterilizer, comprising an elongated support having a pair of longitudinally spaced lamp holders depending therefrom, a tube type ultraviolet lamp extending between and carried by said lamp holders beneath and spaced from said support, elongated upper reflector means carried by said support in the space between it and said lamp, and having upwardly and laterally disposed downwardly facing reflector portions lying on opposite sides of the vertical plane of the longitudinal axis of said lamp, and elongated lower reflector means suspended from said support and having upwardly and laterally disposed upwardly facing reflector portions lying on opposite sides of the aforesaid vertical plane for cooperation with said upper reflector means in directing laterally from both sides of the sterilizer ultraviolet radiations emitted by said lamp.

12. An ultraviolet sterilizer, comprising an elongated housing open at its bottom, a cover plate for the bottom opening of said housing, longitudinally spaced lamp holders having portions thereof lying within said housing and secured to said cover plate and having other portions projecting through and below said cover plate, a tube type ultraviolet lamp extending between and carried by the downwardly projecting portions of said lamp holders, a ballast for said lamp lying within said housing and secured to said cover plate, wiring electrically connecting said lamp holders and said ballast and lying within said housing, end plates secured to and depending from said housing, downwardly facing elongated reflector means carried by said cover plate and located between such plate and said lamp, and upwardly facing reflector means extending between and carried by said end plates for directing upwardly and laterally from both sides of the sterilizer ultraviolet radiations emitted by said lamp.

13. An ultraviolet sterilizer, comprising an elongated support having a pair of longitudinally spaced lamp holders depending therefrom, a tube type ultraviolet lamp extending between and carried by said lamp holders beneath said support, a ballast for said lamp carried by said support, elongated reflector means suspended from said support for directing laterally from both sides of the sterilizer ultraviolet radiations emitted by said lamp, said reflector means having an opening beneath said lamp to permit some of the ultraviolet radiations emitted by said lamp to pass downwardly therethrough.

14. An ultraviolet sterilizer, comprising an elongated support having a pair of longitudinally spaced lamp holders depending therefrom, a tube type ultraviolet lamp extending between and carried by said lamp holders beneath said support, and upwardly facing elongated reflector portions suspended from said support for directing laterally from both sides of the sterilizer ultraviolet radiations emitted by said lamp, said reflector portions being separated by an opening located below said lamp and permitting some of the ultraviolet radiations emitted by said lamp to pass downwardly therethrough.

ROBERT A. HRABAK.